United States Patent [19]

Schürmann et al.

[11] Patent Number: 4,877,302

[45] Date of Patent: Oct. 31, 1989

[54] PLUG CONNECTOR FOR THE ENDS OF TWO LIGHT WAVEGUIDES

[75] Inventors: Erich Schürmann, Sendenhorst; Ulrich Grzesik, Bergisch-Gladbach, both of Fed. Rep. of Germany

[73] Assignee: U.S. Philips Corp., New York, N.Y.

[21] Appl. No.: 179,104

[22] Filed: Apr. 8, 1988

[30] Foreign Application Priority Data

Apr. 9, 1987 [DE] Fed. Rep. of Germany ....... 3711965

[51] Int. Cl.$^4$ ............................................. G02B 6/38
[52] U.S. Cl. ................................................. 350/96.21
[58] Field of Search ............... 350/96.20, 96.21, 96.22, 350/96.23

[56] References Cited

U.S. PATENT DOCUMENTS 4,162,821 7/1979 Schumacher ................... 350/96.21
4,186,997 2/1980 Schumacher ................... 350/96.21

FOREIGN PATENT DOCUMENTS 0029512 6/1981 European Pat. Off. .

Primary Examiner—John D. Lee
Assistant Examiner—Phan T. Heartney
Attorney, Agent, or Firm—Ernestine C. Bartlett

[57] ABSTRACT

The invention relates to a plug connector for the ends of two light waveguides (LWG) which are connected to holders and are pressed in the guide groove of a guide element and are pressed against each other with their end faces by means of an elongate resilient element. In order to substantially avoid damage of the LWG in the coupling process and to ensure a constantly good and low-damping optical connection, the guiding devices are constructed so that at least one of the ends of the LWG (2) can first be moved with a free space over the guide groove over such a distance to the other LWG (1) that a small axial distance remains between the end faces of the LWGs (1, 2) that the LWG (2), while maintaining a small axial distance, is then pressed into the guide groove and that by further movement of the LWG (2) in the guide groove a resilient engagement of the end faces of the LWGs (1, 2) to be connected is then obtained (FIG. 1).

30 Claims, 3 Drawing Sheets

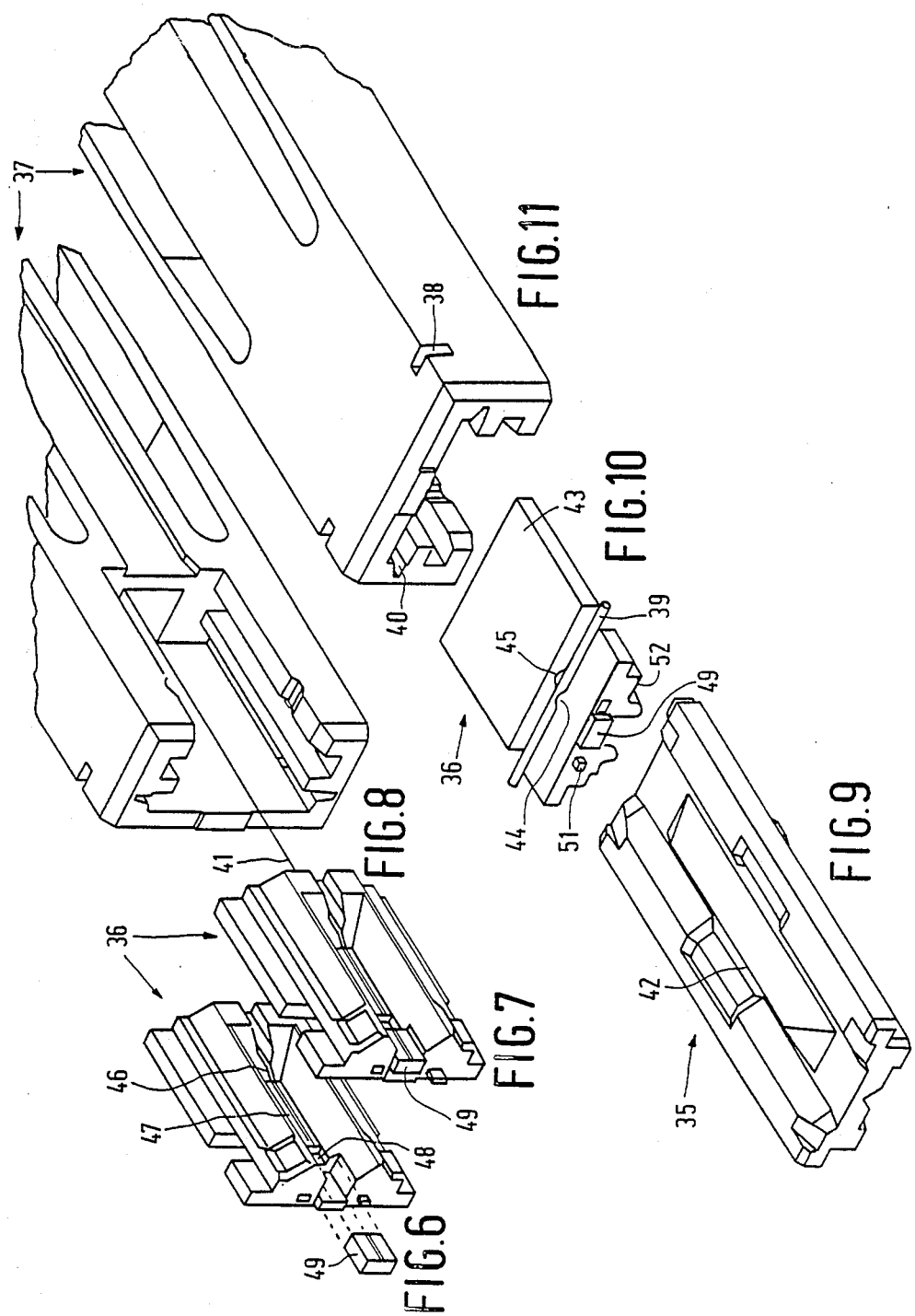

PLUG CONNECTOR FOR THE ENDS OF TWO LIGHT WAVEGUIDES

FIELD OF THE INVENTION

The invention relates to a plug connector for the ends of two light waveguides (LWG) which are connected to holders and can be (a) pressed in the guide groove of a guide element and (b) pressed against each other with their end faces by means of a longitudinal resilient element.

BACKGROUND OF THE INVENTION

In an arrangement of this type known from EP-PS 29512 the end areas of the LWG from which the primary coating has been removed are laid loosely in guide grooves of a holder and are clamped there with their rear area. In the front area they engage a rubber insert member which is to produce the pressure in the guide groove of a guide element. The two holders are pressed against each other by means of a coil spring so that at the same time the end faces of the two LWGs closing the end faces of the holder satisfactorily are laid against each other. In the coupling process the ends of the LWG must be guided through the guide groove of the guide element against the frictional force caused by the pressure of the insert element. In particular the end faces of the LWG can be damaged. Moreover the threading of the LWG in the guide groove produces considerable difficulties, in particular because the LWGs before inserting in the guide grooves of the guide element are forced up from their holder by the rubber insert elements.

SUMMARY OF THE INVENTION

An object of the invention is to construct the arrangement of a plug connector for the ends of two light waveguides, which are connected to holders and can be pressed in the guide groove of a guide element as well as against each other by means of a longitudinal resilient element in such a manner that damage of the LWGs in the coupling process is substantially eliminated and a constantly good and low-damping optical connection is ensured.

This object is achieved in that the guide devices are constructed so that at least one of the ends of the LWG can first be moved with a free space over the guide groove over such a distance towards the other LWG that a small axial distance remains between the end faces of the LWG so, that the LWG can then be pressed into the guide groove while still at a small axial distance from the other LWG, and by subsequent further movement of the LWG in the guide groove, a resilient engagement of the end faces of the LWGs to be connected is obtained. The LWG is laid in the guide groove laterally and in a position in which the end faces of the LWGs to be connected are still at a small distance so that they cannot be damaged by sliding along each other. The final coupling is then obtained by further movement of the LWG in the guide groove over a very small length of less than 1 mm. The final guiding is taken over only shortly before the LWG pressed in the guide groove of the guide element reaches the final position. In this manner even monomode LWGs can be connected with perfect coaxial alignment.

Preferably, the guiding devices are constructed in such a manner that first the rear part of the LWG and then, with a tilting movement, its front part is moved in the guide groove. As a result of this, turning over of the end faces of the LWG in the material of the guide element is avoided so that it is even possible to manufacture the guide element from a synthetic resin.

In a preferred embodiment of the invention, the guiding devices of the parts which are to be guided with respect to each other consist of corresponding sliding faces having successive longitudinal sections of different heights succeeding in the direction of movement which are situated opposite to each other with some play after reaching the small axial distance between the end faces of the LWGs to be connected. Since the corresponding sliding surfaces in the connected condition (i.e., with end faces engaging each other) of the LWGs to be coupled are no longer situated one on the other, it is ensured that the alignment of the LWGs is determined only by their position in the guide groove of the guide element.

Soft introduction of the LWG in the guide groove of the guide element is achieved in that the successive longitudinal sections of the guiding devices are provided with slopes from one sliding surface into the next.

According to a preferred embodiment, it is ensured that the corresponding sliding surfaces are provided on the one hand to the guide element comprising the guide groove and on the other hand to the holder of the LWG. The sliding surfaces are arranged directly on the components which are to be aligned with respect to each other so that tolerances of the dimensions of further components of a plug housing cannot have any influence.

The resilient elements which produce an axial pressure of the LWG end faces to be connected and a lateral pressure of the LWG in the guide groove of the guide element are advantageously provided between the holder and a plug housing. The construction of the resilient elements can be done in various manners. For example, coil springs or rubber intermediate members may be used as in the case of the EP-PS 29 512.

In a preferred embodiment of the invention, however, it is ensured that the resilient elements are elongate extensions of the holder. The integrated resilient elements can produce both axial spring forces and lateral spring forces which are at right angles thereto. A holder integrated with resilient elements may be manufactured from a suitable synthetic resin as an injection moulded part.

It is furthermore possible to connect such a holder of the resilient elements with the plug housing as one member. Preferably the holder is locked as a separate component in a plug housing. The bonding of the LWG to the holder can then be produced unhinderedly from the plug housing. Moreover, different materials may be used and preferably, a high-quality and expensive material is used for the holder.

In a preferred embodiment, a resilient rod which is preferably locked with its end area in a plug housing, is forced axially with its central area against abutments of the holder for the LWG in the direction of the end face of the LWG and at right angles thereto in the direction of the guide groove of the guide element.

The guide element may be locked in the plug housing, a locked connection with the mating connector being avoided, since otherwise the guide element upon releasing the coupling part remains in the connector housing with which it is locked.

The plug housings of LWGs to be connected may be directly coupled together when, for example, one of the plug housings has a coupling connection enclosing the other plug housing.

It is preferred, however, that equal plug housings formed according to the invention can be introduced into a plug housing from both sides and be fixed by locking.

It is preferred that the locking elements for the locking of the plug housings have a sloping surface in the connector housing by which an axial pressure is maintained in the plug housing.

The end faces of the LWG engage each other sooner than the end faces of the plug housings. As a result of this a defined pressure of the resilient LWG end faces is produced.

Since the holder and the guide element have corresponding threading guides which in particular also guide transversely to the direction of pressure, the LWG slides reliably in the guide groove of the guide element contacting other parts of the plug connector.

In a defined position the LWG is connected to the holder for example it is bonded in a V-shaped groove of the holder.

A good and reliable bond is achieved in that the LWG is bonded in the groove of the holder via its primary coating consisting of a synthetic resin. The primary coating is therefore not removed from the LWG before bonding. Since, however, the quartz glass sheath underlying the primary coating has a smaller displacement with respect to the optical axis of the LWG, it is preferred that the contact surfaces of the LWG with the guide groove of the guide element are circumferential areas of the sheath layer of the LWG from which the primary coating has been removed. The alignment of the LWGs to be coupled is then determined by the guide groove of the guide element via the sheath layer. Due to the mutual coaxial and precise alignment of the cores of the LWGs the method of alignment according to the invention is particularly advantageous also for connecting monomode LWGs.

In order to prevent damage to the end faces of the LWG it is preferred that at least one axial projection projecting over the end face of the LWG is provided on the holder and fits in a recess of a corresponding holder to be coupled.

An alternative embodiment of a holder which enables a particularly good alignment of the LWG is characterized in that a flexible insert element is inserted in the front area of the holder and receives with a groove an end area of the LWG from which the coating has been removed and which has been gently pressed in the guide groove of the guide element. It is preferred that a flat groove section for guiding the LWG is provided in the holder at an axial free distance to a flexible insert element.

A particularly rigid bonding of the LWG in such a holder is achieved when the rear area of the holder comprises a widening which extends over the inserted LWG and in which an adhesive amply covering the LWG has been provided.

BRIEF DESCRIPTION OF THE DRAWING

The invention will now be described in greater detail, by way of example, with reference to the accompanying drawing, in which

FIG. 6 shows a modified holder before the insertion of an insert element.

FIG. 7 shows the FIG. 6 holder with inserted insert element.

FIG. 8 shows partly a plug housing for receiving the holder of FIG. 6.

FIG. 9 shows a guide element adapted for the FIG. 6 holder.

FIG. 10 is another elevation of the FIG. 6 holder with inserted resilient rod.

FIG. 11 shows another elevation of the plug housing according to FIG. 8.

DETAILED DESCRIPTION OF THE PREFERRED EMBODIMENTS

Figure 1:
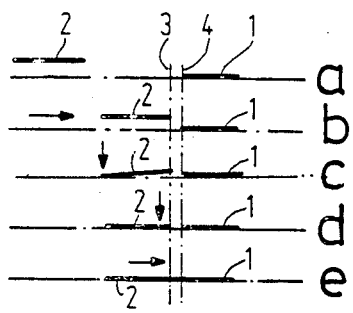
FIG. 1 shows diagrammatically successive positions of the LWGs to be connected in the coupling process.

FIG. 1 shows the characteristic stages a to e, which occur in the coupling process of a plug connector according to the invention. 1 denotes the LWG already fixed in a guide groove of a guide element. In stage a the LWG 2 to be connected to the LWG 1 is in the position shortly before penetrating into a coupling member (for example, a connector housing for two plug housings). The LWG 2 bonded to a holder is first moved parallel and with a distance to the guide groove up to the line 3, in accordance with stage b and has a small distance to the line 4 denoting the end of the LWG 1. First a rear area of the LWG 2 is laid in the guide groove in accordance with stage c and then its front area (stage d). The LWG 2 is then moved closer coaxially to the LWG 1 (stage e). The movement to stage c is necessary only in particularly high quality plug connectors.

In the further Figures particularly preferred embodiments of a plug connector according to the invention are described with which a process according to FIG. 1 is achieved.

The essential components are the guide element 5, the holder 6 integrated with resilient elements and the plug housing 7. These components are shown assembled in FIG. 3. The plug housing 7 has a slot 8 which is open towards the connector end so that it can be expanded for locking the holder and the guide element 5. The catches 9 of the holder 6 snap in recesses 10 of the plug housing 7 and locking members 11 of the guide element 5 snap into recesses 12 of the plug housing 7. After locking the guide element 5 is in the plug housing 7 free from play. The holder 6, however, can be swung to a small extent about the axis of the catches 9 and comprises a certain lateral play in the direction of the axis. Sloping surfaces 13 and 14 and 15 and 16, respectively, (also see FIG. 4) provided directly on said component ensure a lateral alignment of holder 6 and guide element 5.

In the top area of the sloping surfaces 15 and 16 of the guide element 5 a prismatic guide groove 17 is provided by which the LWGs to be coupled, namely the LWG 18 bonded to the holder 6 and a second LWG not shown, are aligned coaxially to each other.

First the holder 6 with the supporting arms 19 which are connected integrally with the holder 6 via elongate resilient arms 20 is inserted into the provided receiving grooves of the plug housing but is not locked therein. The end face of the holder locking the end face of the LWG 18 projects slightly from the plug housing 7. The guide element 5 is then inserted into the receiving grooves 22. The holder 6 is first lifted against the resilient force of the resilient arms 20 since sliding cams of the holder 6 which are formed as raised portions of their slide 23 in the front area are urged over the elevated sliding surface areas 24 of the guide element. The raised portions of the slides 23 then are lowered to the lowered portions 25 of the sliding surfaces of the guide element 5 and are then further moved axially until the stage b shown in FIG. 1 is reached. Finally the rear side of the holder 6 also slides over the sloping surface 26 on the section 25 so that a tilted position of the holder 6 shown in FIG. 1, stage c, is formed. The raised portions of the slides 23 then immediately slide into the area 27 of the guide element 5 free from sliding surfaces, as a result of which the stage d shown in FIG. 1 is obtained. The guide element is then locked in the plug housing 7 so that an arrangement shown in FIG. 3 is obtained.

Figure 4:
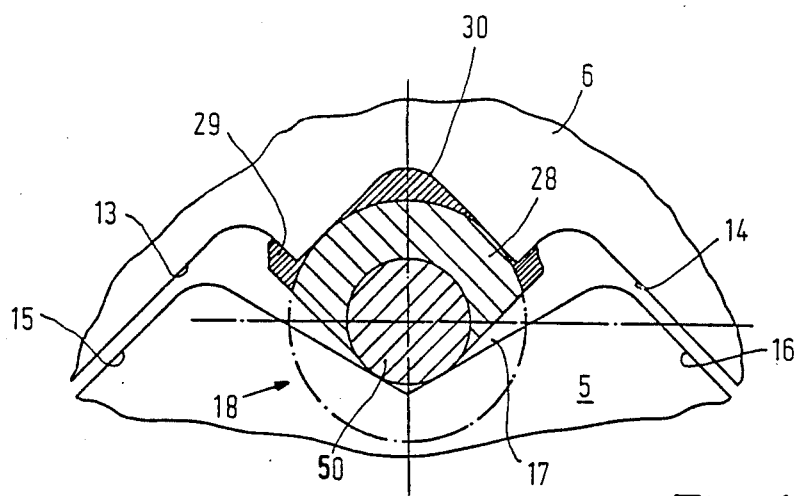
FIG. 4 shows on an enlarged scale the bonding of an LWG to its holder.

FIG. 4 shows the bonding of the LWG 18 to the holder 6 on an enlarged scale. The LWG 18 is bonded with its protective coating 28 in a defined guide groove 30 of the holder 6 by means of a suitable adhesive 29. After the bonding the protective coating on the free side of the LWG 18 is removed by a stripping tool at least at those areas where the sheath 50 of the LWG 18 consisting of quartz glass is to engage the angular corner surfaces of the prismatic guide groove 17.

Figure 5:
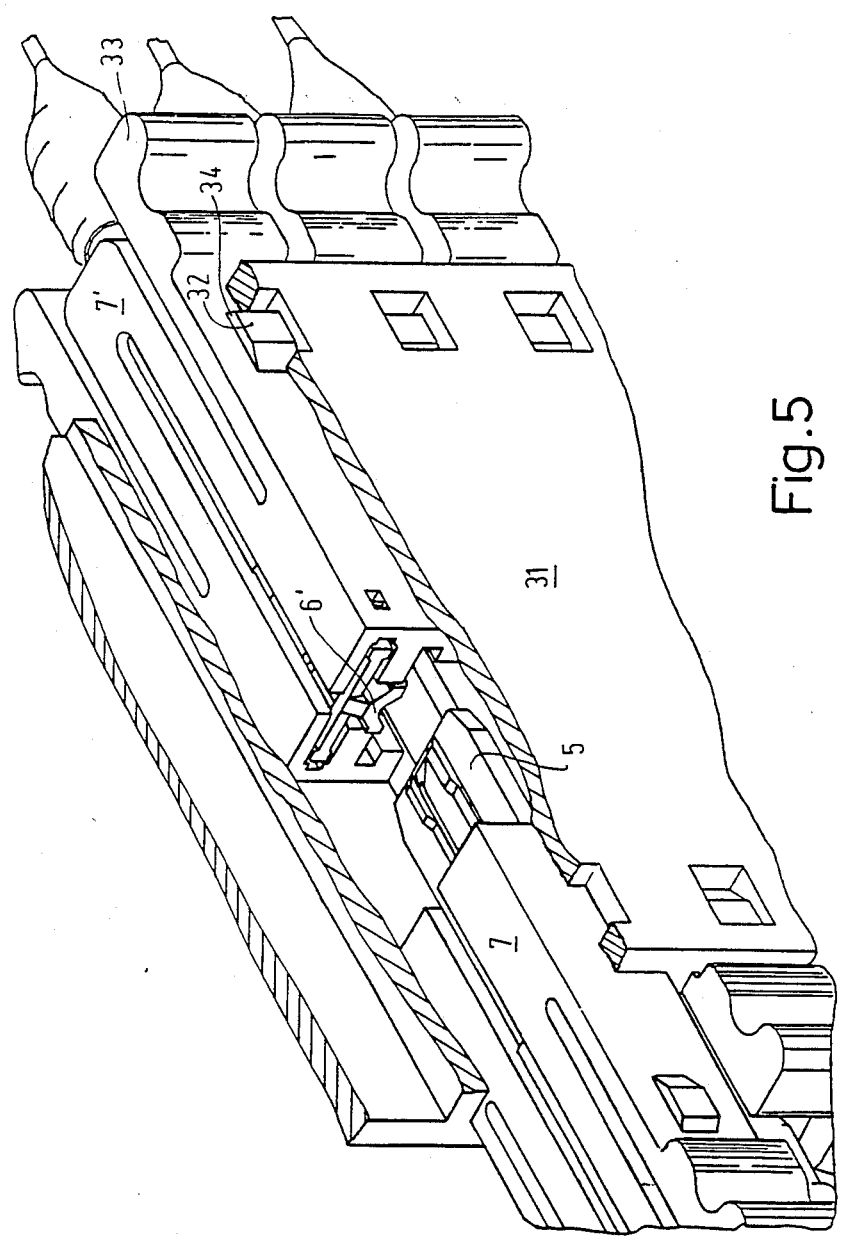
FIG. 5 is a perspective view of a plug inserted into a multiple plug connector housing.

FIG. 5 shows, partly broken away, a part of a multiple plug connector housing 31 consisting of several plug housings 7 in which the locking cams 32 of the plug housing 7 which are provided on resilient gripping arms 33 which can be swung back are locked. The sloping faces 34 of the locking cams 32 produce an axial resilient force on the plug connector housings 7 as a result of which it is achieved that a plug connector housing 7 firmly engages a corresponding similar plug housing 7' with their connection faces in mutually locked position.

Figure 2:
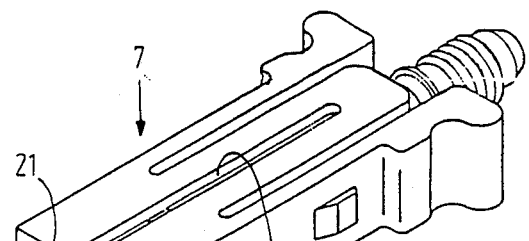
FIG. 2 is a perspective view of the individual components of a plug to be composed.
Figure 3:
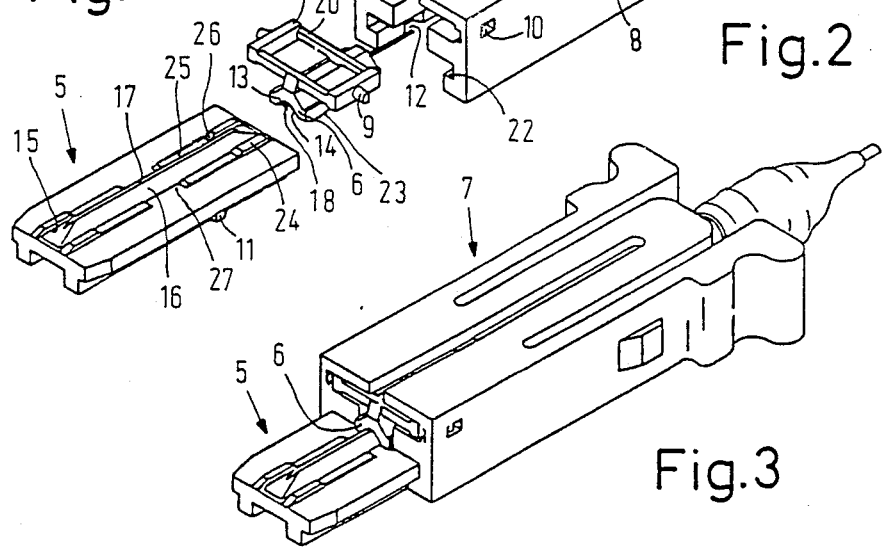
FIG. 3 is a perspective view of the components shown in FIG. 2 in the composed condition.

In FIG. 5 a plug housing 7 provided with a guide element in accordance with FIG. 3 is coupled to a corresponding similar plug housing 7' which, however, comprises only a holder 6' supporting the opposite LWG and does not comprise a guide element. The coupling process occurs analogously to the process already described of the uniting of the components shown in FIG. 2.

It is essential that the holders 6 and 6' in the final position are moved back in their plug housings 7 and 7' against the resilient force of the resilient arms 20. In particular with round ground LWL end faces which project over the end faces of the holder 6 a permanent and defined resilience can be produced which presses the end faces of the LWGs together. This resilient force should be essentially larger than the counteracting frictional force which arises from the elastic pressure force with which the LWGs are forced in the guide groove 17 of the guide element 5.

All the components of the plug connector according to the invention may be manufactured from synthetic resins selected especially for the purpose. Detrition phenomena and pollution of the guide element may occur after a high number of coupling processes. In such cases the guide element should be charged or replaced.

FIGS. 6 to 11 show essential components of a plug connector according to the invention in an embodiment which is modified with respect to FIGS. 2 to 4.

The guide element 35 shown in FIG. 9 corresponds substantially to the guide element 5 shown in FIGS. 2 and 3, in which only structural arrangement of the guide surfaces has been varied in a manner operating substantially the same.

The plug housing 37 also corresponds substantially to the plug housing 7 of FIGS. 2 and 3. The ends of the resilient rod 39 shown in FIG. 10 after inserting in the grooves 40 are locked in modified recesses 38.

The essential changes of the arrangement shown in FIGS. 6 to 11 relate to the holder 36 shown in FIGS. 6, 7 and 10 for an LWG 41 shown in FIG. 7.

The connection of the holder 36 in the plug housing 37 resilient axially to the end face of the LWG 41 and at right angles thereto in the direction of the guide groove 42 of the guide element 35 occurs via a steel resilient rod 39 which is inserted loosely in a wide recess of the guide plate 43 of the holder 36. During insertion of the holder 36 its ends are guided by the grooves 40 of the plug housing until they lock in the recesses 38. The abutments 44 and 45, respectively, of the holder 36 permit a certain swing of the holder 36 in two planes which are at right angles to each other, one of which extends through the LWG 41. The abutments further permit a resilient bending of the resilient rod 39 so that with corresponding holders 36 coupled together a resilient pressure force of the LWGs to be coupled and the fixed pressure thereof in the guide groove 42 of the guide element 35 is maintained.

In contrast with the holder 6 shown in FIGS. 2 of 3, respectively, the LWG 41 is not bonded in a groove which is formed uniformly throughout its length but which extends over four different sections. At the rear end of the holder 36 a deep insert-channel is present in which the LWG 41 is enveloped on all sides by adhesive so that also in the case of mechanical load it is immovably and safely fixed.

The groove section 47 ensures the axial alignment of the LWG 41 and comprises a flat receiving groove according to position 30 shown in FIG. 4 in which the LWG 41 is bonded on one side.

At the area of the said groove section the LWG 41 is fixed firmly in the guide groove 42 of the guide element 35 (FIG. 9) and is aligned with respect to the guide groove 42. The LWG 41 then passes without guidance over a free distance 48 and projects with its preferably spherical end face over the front end face of the holder 36 by a small extent of approximately 20 $\mu$m.

At the front area of the holder 36 the LWG 41 whose coating has been removed (compare with 28 in FIG. 4) lies in a groove of a flexible insert element 49 preferably without adhesive. From this insert element 49 the end area of the LWG 41 is forced flexibly in the guide groove 42 in such a manner that alignment errors cannot occur. The free distance 48 facilitates the unhindered adaptation of the LWG 41 to the variation of the guide groove 42.

In order to avoid damage to the end faces of the LWG 41 by contacts, which is possible as long as no plug connection has been made, an axial extension 51 is provided at the end face of the holder 36 and projects axially over the end face of the LWG 41. When the plug connection has been made, the projection 51 fits in an associated recess 52 of a corresponding holder 36 so that the engagement of the end faces of the LWGs 41 to be coupled is not obstructed.

What is claimed is:

1. A plug connector for the ends of two light waveguides which are connected to holders and can be pressed in the guide groove of a guide element and can be pressed against each other with their end faces by means of a longitudinal resilient element, wherein the guide devices are constructed so that at least one of the ends of the second light waveguide (2) can first be moved with a free space over the guide groove over such a distance towards the other light waveguide (1) that a small axial distance remains between the end faces of the two light waveguides that one light waveguide (2) can then be pressed into the guide groove while maintaining said small axial distance, and by further movement of the pressed second light waveguide (2) in the guide groove a resilient engagement of the end faces of the two light waveguides (1, 2) to be connected is then obtained.

2. An arrangement as claimed in claim 1, wherein the guides are constructed so that first the rear part of the second light waveguide LWG and then its front part are moved into the guide groove by means of a tilting movement.

3. An arrangement as claimed in claim 1 or 2, wherein the guides of the parts to be guided consist of corresponding sliding surfaces (23, 24, 25) with longitudinal sections of different heights succeeding in the direction of movement and which are situated opposite to each other with some play after reaching the small axial distance of the end faces of the light waveguide to be connected.

4. An arrangement as claimed in claim 1, wherein the succeeding longitudinal sections (24, 25) of the guides are provided with transition slopes (24) from one sliding surface (26) to the next (25).

5. An arrangement as claimed in claim 1, wherein the corresponding sliding surfaces (23 and 24, 25, respectively) are provided on the guide element (5) comprising the guide groove and on the holder (6) of the light waveguide (18).

6. An arrangement as claimed in claim 5, wherein the movement of the holder (6) is limited by fixed abutments.

7. An arrangement as claimed in claim 1, wherein the holder for the light waveguide (18) is connected to a plug connector housing (7) via resilient elements (20).

8. An arrangement as claimed in claim 7, wherein the resilient elements are profiled parts of an elastomeric synthetic resin which is under stress by compression or tension and/or bending.

9. An arrangement as claimed in claim 1, wherein the holder (6) can be swung to the direction of movement.

10. An arrangement as claimed in claim 1, wherein the resilient elements (20) are elongate extensions of the holder 6.

11. An arrangement as claimed in claim 1, wherein a resilient rod (39) which is locked with its rear area in a plug housing (37), is forced axially with its central area against abutments (44 and 45) of the holder (36) for the light waveguide (41) in the direction of the end face of the light waveguide (41) and at right angles thereto in the direction of the guide groove (42) of the guide element (35).

12. An arrangement as claimed in claim 1, wherein the holder 6 is locked in a plug housing (7) as a separate component.

13. An arrangement as claimed in claim 1, wherein the guide element (5) is locked in the plug housing (7).

14. An arrangement as claimed in claim 1, wherein the plug housing (7) can be plugged into a plug connector housing (31) and can be fixed therein by locking.

15. An arrangement as claimed in claim 1, wherein the guide elements (32) provided for locking the plug housing (7) in the plug connector housing (31) comprise a sloping surface (33) by which an axial pressure is maintained in the plug connector housing (31).

16. An arrangement as claimed in claim 15, wherein similar plug housings (7,7') can be introduced from two open sides into the plug connector housing (31) and can be moved towards each other with their end faces.

17. An arrangement as claimed in claim 16, wherein the end faces of the light waveguides upon engaging the end faces of the plug connector housing (7, 7') are moved back axially resiliently.

18. An arrangement as claimed in claim 17, wherein the end faces of the light waveguide and the end faces of the plug housings (7, 7') in the connected condition are situated substantially in a common connection plane.

19. An arrangement as claimed in claim 1, wherein the holder (6) and the guide element (5) comprise corresponding threading guides (13 to 16).

20. An arrangement as claimed in claim 19, wherein the threading guides (13 to 16) are each formed as two faces arranged at an angle with respect to each other.

21. An arrangement as claimed in claim 1, wherein the light waveguide (18) is bonded in a V-shaped groove (30) of the holder (6).

22. An arrangement as claimed in claim 1, wherein the light waveguide (18) is bonded in the groove (30) of the holder via its primary coating (28) comprising a synthetic resin.

23. An arrangement as claimed in claim 22, wherein the contact surfaces of the light waveguide with the guide groove (17) of the guide element (5) are circumferential areas of the sheath coating (30) of the light waveguide (18) from which the primary coating has been removed.

24. An arrangement as claimed in claim 1, wherein axial resilient elements (20) and resilient elements operating at right angles thereto in the direction of the guide groove of the guide element are provided.

25. An arrangement as claimed in claim 1, wherein at least one axial projection (51) projecting over the end face of the light waveguide (41) is provided on the holder (36) and fits in a recess (52) of a corresponding holder (36) to be coupled.

26. An arrangement as claimed in claim 25, wherein a flexible insert element (49) is inserted in the front area of the holder (36) and with a groove receives the end area of the light waveguide (41) from which the coating has been removed and gently presses said end area in the guide groove (42) of the guide element (35).

27. An arrangement as claimed in claim 26, wherein a flat groove section (47) for guiding the light waveguide (41) is provided in the holder (36) with an axial free distance (48) to the flexible insert element (49).

28. An arrangement as claimed in claim 27, wherein the rear area of the holder (36) comprises a widening (46) which projects over the inserted light waveguide (41) and in which an adhesive covering the light waveguide (41) is provided.

29. A plug connector for the ends of two light waveguides which comprises:

a guide element (5) for a first light waveguide comprising locking elements (11) disposed at side walls thereof; sloping surfaces (15), (16); a groove (17) by which the light waveguides are aligned coaxially; and sliding surfaces (24), (25) with longitudinal sections of different heights provided with transition area (27) and transition slopes 26 from one sliding surface (24) to the next (25);

a holder 6 comprising a light waveguide (18) attached thereto and comprising catches (9) disposed at sidewalls thereof; elongate resilient arms (20); supporting arms (19) at right angles to the resilient arms (20); and sliding surface (23) with sloping surfaces (13) and (14) formed integral therewith; and a plug housing (7) comprising a slot (8); recesses (10) disposed in the sidewalls thereof for receiving the catches (9) of the holder; recesses (12) disposed in the sidewalls of the housing for receiving the locking members 11 of the guide element (5); receiving grooves (21) for receiving the holder (6) and receiving grooves (22) for receiving the guide element (5);

said connector being assembled by the steps of:

inserting the holder into the receiving grooves (21) of the plug housing (7);

inserting the guide element (5) into the receiving grooves 22 of the plug housing;

lifting the holder over the elevated sliding surface areas (24) of the guide element via the sliding surface (23);

lowering the raised portions of the sliding surface (23) to lowered portions (25) of the guide element (5) and then moving the sliding surface (23) axially so that a small axial distance remains between the end surfaces of the light waveguides;

sliding the rear side of the holder 6 over the slope (26) on the surface (25) so that a tilted position of the holder is formed whereby the raised portions of the sliding surface (23) slide into the area (27); and locking the guide element into the plug housing by further movement of the guide element whereby a resilient engagement of the end faces of the two light waveguides to be connected is obtained.

30. A plug connector for the ends of two light waveguides which comprises a guide element, a holder integrated with resilient elements to which a first light waveguide is attached, and a plug housing for receiving the guide element and holder, the guide element comprising sliding faces having successive longitudinal sections of different heights and provided with slopes from one sliding surface to the other, and the holder comprising sliding cams formed as raised portions of a slide, whereby when the guide element and the holder are assembled in the plug housing with portions of the holder superimposed over the guide element, the corresponding sliding surfaces and sloping surfaces cooperate to permit a soft introduction of the light waveguides in the guide groove and a resilient engagement of the end faces thereof in the connector.

* * * * *